Jan. 10, 1950     A. ZWALD     2,494,222
POWER TRANSMISSION
Filed July 24, 1945     2 Sheets-Sheet 1
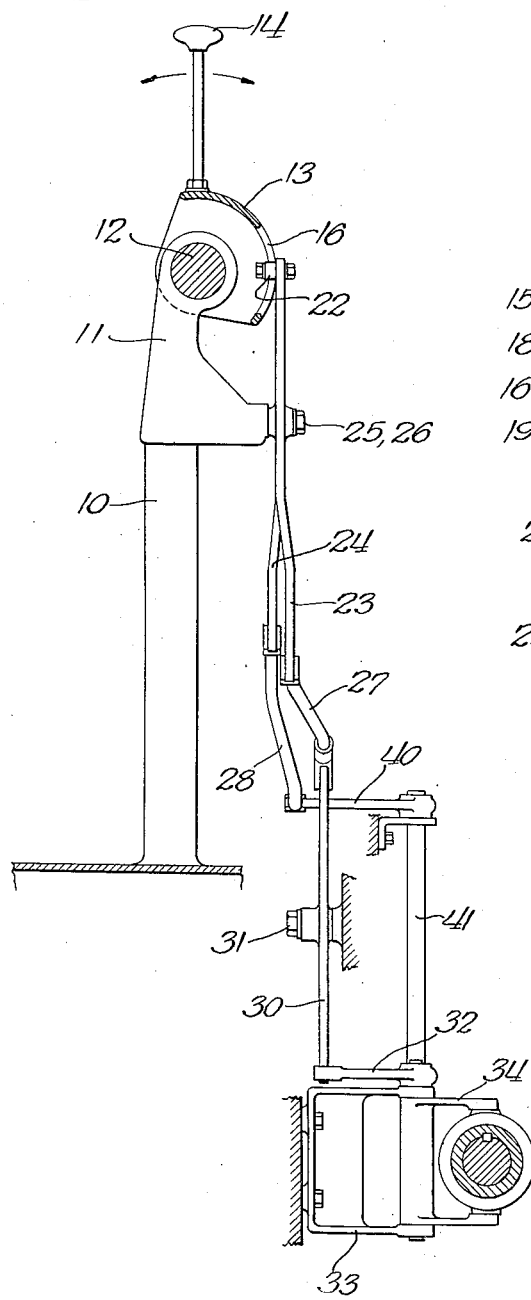
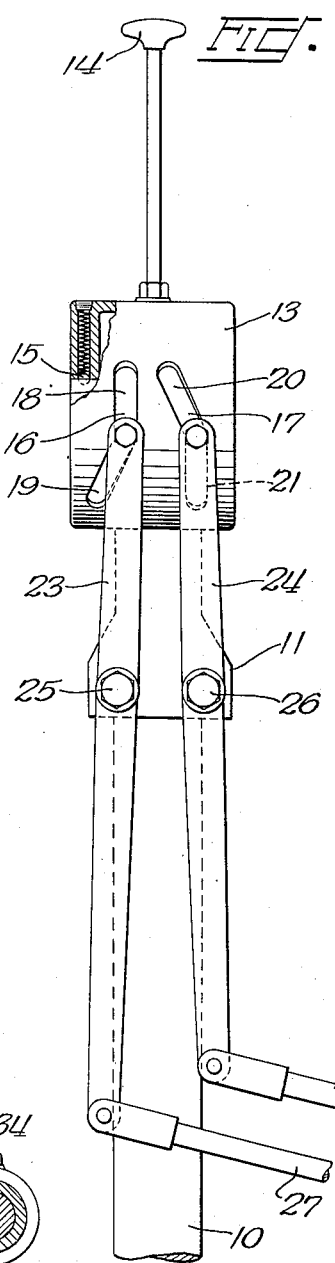
INVENTOR
Adolph Zwald
BY
Harold D Cook
ATTORNEY

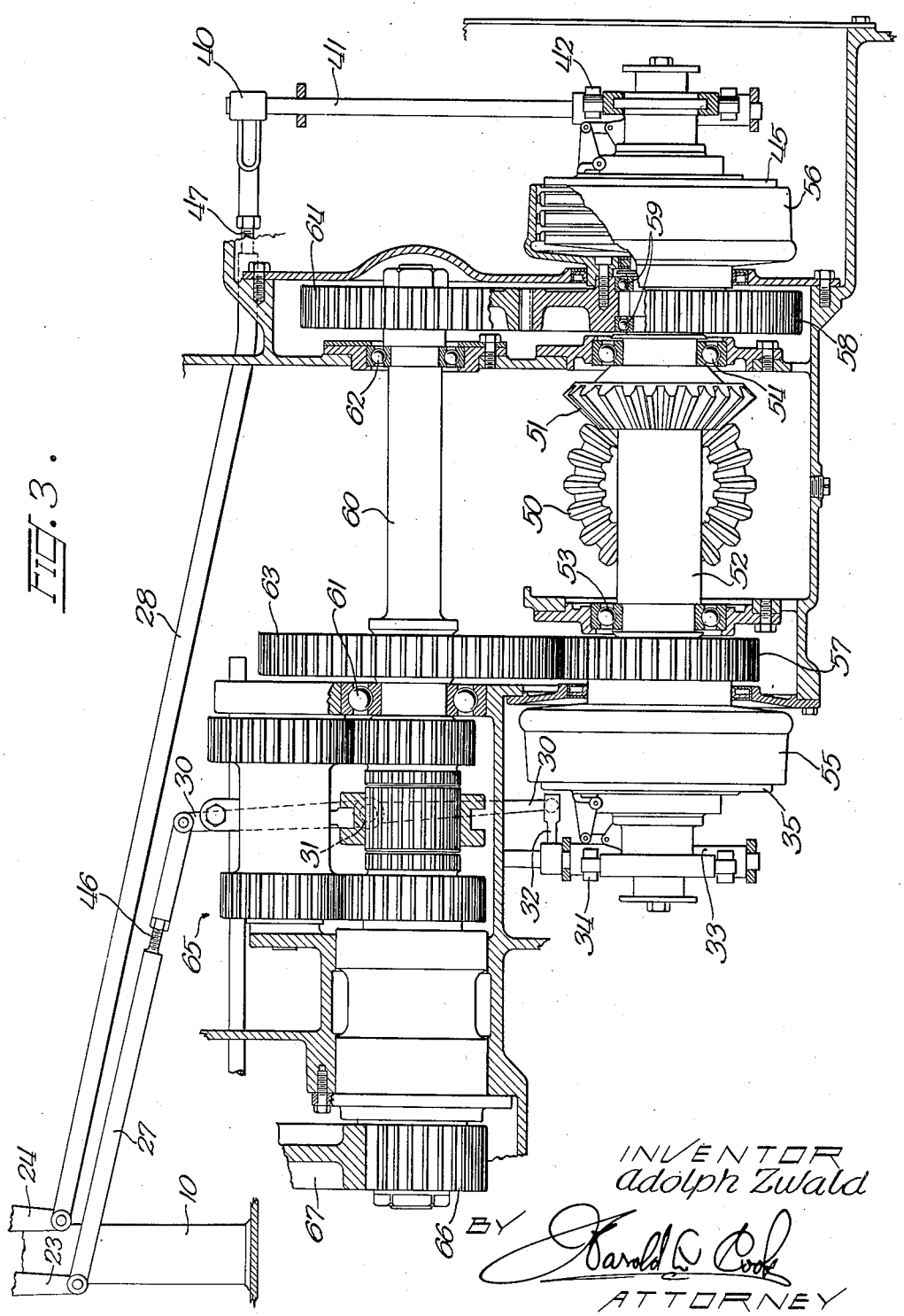

Patented Jan. 10, 1950

2,494,222

UNITED STATES PATENT OFFICE 2,494,222

POWER TRANSMISSION

Adolph Zwald, Portland, Oreg., assignor to Hyster Company, Portland, Oreg., a corporation of Oregon Application July 24, 1945, Serial No. 606,834

2 Claims. (Cl. 74—473)

This invention relates to improvements in power transmission gearing, and has particular reference to a novel control device for changing the gear ratio of the transmission.

The object of the invention, in general, is to provide an improved single lever control to coordinate properly the operation of a plurality of clutches or other devices for changing the gear ratio in a transmission.

A particular object of the invention is to provide a single lever control having a central neutral position and being movable in opposite directions therefrom to engage one or the other of a pair of clutches effective to establish either a low or a high gear drive in the transmission.

In accomplishing the above objects, a further object is to provide a novel rotatable shifter quadrant having a plurality of diagonal guide means for coordinately moving different shifting members to change the transmission ratio in accordance with movements of the shifter quadrant.

With the foregoing and other objects in view, the invention resides in the combination of parts and in the details of construction hereinafter set forth in the following specification and appended claims, a preferred embodiment thereof being illustrated in the accompanying drawings, in which:

Figure 1 is a view in rear elevation of my novel shifter quadrant and associated levers for controlling the transmission, Figure 2 is a view drawn to a smaller scale at right angles to Figure 1, partly in elevation and partly in section, showing the linkage between the shifter quadrant and instrumentalities in the transmission, and Figure 3 shows the power transmission to which the invention is applied, being a continuation on a smaller scale of the view shown in Figure 1.

Referring first to Figures 1 and 2, the numeral 10 indicates a control pedestal mounted conveniently for the operator of the power transmission device. Pedestal 10 carries a head bracket 11 having a shaft 12 pivotally mounting a cylindrical shifter quadrant 13. The quadrant 13 may be manipulated by a handle 14 for rotation in opposite directions from a neutral position, as indicated by the arrows in Figure 2, a resilient ball detent 15 being arranged to cooperate with a depression in the shaft 12 to index the quadrant in the neutral position.

The shifter quadrant 13 transmits control functions by means of two slots 16 and 17 having ends 18 and 21, respectively, directed at right angles to the shaft 12, and having ends 19 and 20, respectively, directed angularly with respect to the ends 18 and 21. Slots 16 and 17 guide the movements of cam followers 22 on the upper ends of levers 23 and 24, pivotally mounted at 25 and 26 on the stationary head bracket 11. The lever 23 constitutes a low clutch lever, being pivotally connected at its lower end with a low clutch link 27, and the lever 24 constitutes a high clutch lever, being pivotally connected at its lower end with a high clutch link 28. The low clutch link 27 is pivotally connected with a lever 30 having a supporting pivot 31 at its mid-portion, and having pivotal connection at its lower end with a bell crank 32. The bell crank 32 is journaled in a stationary supporting bracket 33 and is rigidly connected with a shifter yoke 34 which is effective to engage and disengage a multiple disc clutch 35.

The high clutch link 28 is pivotally connected with a bell crank arm 40 on a shaft 41 carrying a shifter yoke 42. The shifter yoke 42 is operative to engage and disengage a multiple disc clutch 45. The numerals 46 and 47 indicate length adjustments in the links 27 and 28.

In the transmission (Figure 3), the bevel gear 50 is on the power take-off shaft from a prime mover source of power. A second bevel gear 51 meshes with the gear 50 and is keyed on the shaft 52 so that the latter is constantly rotating in bearings 53 and 54 as long as the prime mover is operating. The clutches 35 and 45 include multiple disc assemblies having one set of plates rotatable with the shaft 52, and another set of plates rotatable with external shells 55 and 56. The shell 55 is mounted on a small gear 57 and the shell 56 is mounted on a larger gear 58, and each of these gears is carried on bearings 59 for free rotation on the shaft 52. When the clutches are disengaged the shaft 52 rotates in the bearings 59 without producing rotation of gears 57 and 58.

A shaft 60 mounted in bearings 61 and 62 carries gears 63 and 64 splined thereto and constantly in mesh with the previously mentioned gears 57 and 58. The shaft 60 drives through a second gear changing transmission, indicated generally by the reference numeral 65, to deliver power to a pair of gears 66 and 67 on the device to be operated.

It will be observed from the foregoing description that the clutches 35 and 45 are operative to provide two different transmission ratios for rotation in the same direction, and to provide a neutral or non-rotating condition. When both clutches are disengaged, both the gears 57 and 58 will be disconnected from the rotating shaft 52, thereby also disconnecting the transmission unit 65 and the power output gears 66 and 67. The condition where both clutches are disengaged is that illustrated in the drawings wherein the cam followers 22 on the high and low clutch levers rest in the mid-portions of the slots 16 and 17 in the shifter quadrant. It is noted that the arrangement of the slots is such that in this position both cam followers 22 lie in the slot portions 16 and 21 at right angles to the shaft 12.

If the control lever 14 is moved to the left, as viewed in Figure 2, the high clutch lever 24 will be held in neutral position and the low clutch lever 23 will be rotated counterclockwise, as viewed in Figure 1, to engage the clutch 35. This establishes a low driving ratio through the small gear 57 to rotate the gears 66 and 67 at low speed.

When the lever 14 is moved in a clockwise direction as viewed in Figure 2, the low clutch lever 23 will be maintained in neutral position as shown in Figure 1 to maintain the clutch 35 disengaged. The high clutch lever 24 will then be rotated counterclockwise, as viewed in Figure 1, to engage the clutch 45 and produce rotation of the gear 58. This gear being larger than the gear 57, the shaft 60 and the gears 66 and 67 will then be rotated in high gear drive.

The present arrangement provides for rapid shifting when necessary, the clutches absorbing the shocks resulting from quick changes so as to prolong the life of the transmission. This transmission is particularly designed for a drum yarder mounted on a tractor for heavy duty use in the logging industry, and similar operations, but the invention is of general application to many different kinds of power transmission, the present embodiment being illustrated by way of example and not as a limitation of the invention.

I also wish it to be understood that I do not desire to be limited to the exact details of construction shown and described, for obvious modifications will occur to persons skilled in the art.

Having now described my invention and in what manner the same may be used, what I claim as new and desire to protect by Letters Patent is:

1. In a two speed power transmission for driving winch drums and the like, low and high speed shifter yokes for changing the driving ratio of the transmission, each of said shifter yokes having driving and neutral positions, levers connected with said yokes, links operatively connected with said levers, a stationary bracket remote from said transmission, a pair of shifting levers pivotally mounted on said bracket and connected with said respective links, cam followers on said shifting levers, a cylindrical shifter quadrant mounted for limited rotation on said bracket, cam slots for said followers in said quadrant, each slot having one end portion disposed in a plane perpendicular to the rotational axis of the quadrant to hold its shifting lever stationary in neutral position and an opposite end portion angularly disposed to move its shifting lever, the angular ends of the two slots being oppositely directed around the quadrant to move only one shifting lever at a time when the quadrant is rotated and said slots being relatively positioned to hold both shifting levers in neutral position when the cam followers are engaged in central portions of the slots, a handle for rotating said quadrant, and a resilient indexing device on the quadrant to hold central and end portions of the slots engaged with said followers.

2. In a power transmission for driving winch drums and the like, low and high speed shifter members in the transmission for changing the driving ratio, each of said members having driving and neutral positions, a control pedestal having a shifter quadrant mounted for limited rotation, a handle on said quadrant, resilient indexing means to hold the quadrant in a central neutral position and low and high end positions of rotative movement, a pair of cam slots in said quadrant, low and high shifting levers mounted intermediate their ends on said pedestal, cam followers on the upper ends of said levers engaged in said cam slots, operating links for said shifter members connected with the lower ends of said levers, and a length adjustment in each of said links, the cam slot for the low speed shifting lever having an end and central portion to hold said low speed shifter member in neutral position when the quadrant is in high and neutral positions and having an opposite angular end portion to move said shifter member to driving position when the quadrant is moved to low position, and the cam slot for the high speed shifting lever having an end and central portion to hold said high speed shifter member in neutral position when the quadrant is in low and neutral positions and having an opposite angular end portion to move said shifter member to driving position when the quadrant is moved to high position.

ADOLPH ZWALD.

REFERENCES CITED

The following references are of record in the file of this patent:

UNITED STATES PATENTS

| Number | Name | Date |
| --- | --- | --- |
| 691,968 | Paine | Jan. 28, 1902 |
| 1,415,239 | Hupp | May 9, 1922 |
| 1,552,873 | Osborn | Sept. 8, 1925 |
| 1,710,002 | Pearson | Apr. 23, 1929 |
| 1,819,889 | Getz | Aug. 18, 1931 |
| 2,170,982 | Ellinwood | Aug. 29, 1939 |
| 2,258,475 | Sinclair | Oct. 7, 1941 |
| 2,261,432 | Cooke | Nov. 4, 1941 |